R. DARLING.
CRACKER-MACHINE.

No. 180,851.  Patented Aug. 8, 1876.

Attest:
Frank H. Arnold,
James E. Arnold

Inventor:
Riley Darling
by Benj. Arnold
Atty

UNITED STATES PATENT OFFICE.

RILEY DARLING, OF EAST GREENWICH, RHODE ISLAND.

IMPROVEMENT IN CRACKER-MACHINES.

Specification forming part of Letters Patent No. 180,851, dated August 8, 1876; application filed June 16, 1876.

*To all whom it may concern:*

Be it known that I, RILEY DARLING, of East Greenwich, in the county of Kent and State of Rhode Island, have invented certain Improvements in Cracker-Machines, of which the following is a specification:

The object of my invention is to separate the scraps of dough from between the crackers by means of mechanical devices operated by the machine instead of picking them out by hand, as is now done. It consists, first, in cutters so constructed that the strips of scrap-dough are made lengthwise of the main apron; secondly, in a combination of a roller, guard-fingers, and cross-apron, to take up and carry away the strips of scrap-dough between the rows of crackers.

Figure 1:
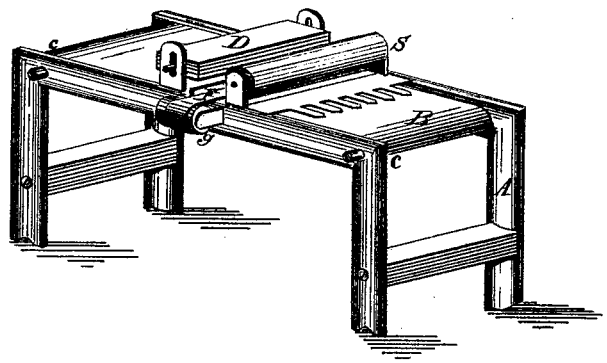
Figure 3:
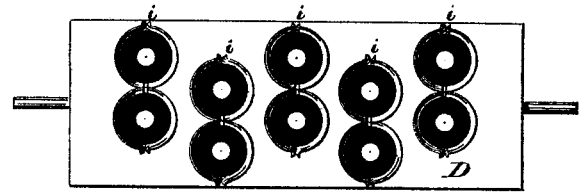
Figure 2:
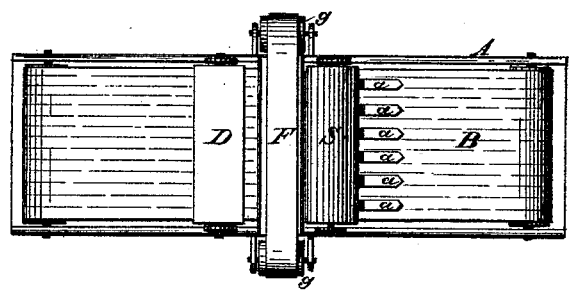

Figure 1 is a perspective view of the improvements. Fig. 2 shows a top view. Fig. 3 is an enlarged view of the cutters.

A is the frame of the cracker-machine. B is the usual apron upon which the crackers are cut, supported on the rolls c c, turning in bearings in the frame A. D is the cutter-block, the cutters on which are set (see Fig. 3) in rows running lengthwise of the main apron, the cutters in each row being set close together, so that each row of crackers will be sufficiently joined together to hold them in place while the continuous strips of scrap-dough left in the spaces between the rows of cutters is drawn up by the roll S. a a a are guard-fingers, supported on the frame on each side of the apron, and so placed that each finger stands over a row of crackers, and the spaces between them over the strips of scrap-dough. S is a roll placed across the machine, in bearings on the side frames, and just back of the guard-fingers, so that the side of the roll will be just over the inner end of the space between the guard-fingers. F is a short apron placed across the machine, on the rollers g g, turning in bearings on the frame. This apron is placed just back of and partly under the roll S.

The roll S may be driven by a belt from one of the apron-rolls c c, and the cross-apron may be driven by a short twisted belt from a pulley put on the shaft of the roll S.

In operation, the sheet of dough is carried by the apron under the cutters and cut. Then it passes along and comes out under the guard-fingers a a. Here the ends of the continuous strips of dough between the rows of crackers are taken up and laid over the roll S, the surface of which, being rough and driven at a little faster speed than the apron, draws the strips up from between the fingers a a, which hold the crackers down. These strips are carried over and deposited on the apron F, which conveys them to the side of the machine, into a vessel set to receive them.

Besides constructing the cutters so as to produce the waste-strip lengthwise of the machine, it is also necessary to provide for any cross-strips of waste that may occur between the different strokes of the cutters by reason of the timing of the strokes not agreeing exactly with the speed of the apron, or because one batch of dough shrinks more than another after leaving the flattening-rolls. This is accomplished by the small cutting-lips *i i i* made on the side of the series of cutters, which sever any strips that may occur in that way.

After starting, the machine will separate the waste scraps itself, where formerly it required the labor of one person, especially in making the smaller sizes of crackers, which largely increased the cost of production.

What I claim as my invention, and desire to secure by Letters Patent, is—

1. The arrangement of the cutters in separate rows running lengthwise of the main apron, and separated by continuous spaces between the rows, the outside cutters being made with the cutting-lips *i i i*, substantially as shown and described, and for the purpose specified.

2. In a cracker-machine, the combination of the cross-apron F with the roll S and guard-fingers a a a, substantially as and for the purpose specified.

RILEY DARLING.

Witnesses:
FRANK H. ARNOLD,
JAMES E. ARNOLD.